United States Patent [19]
Murayama

[11] Patent Number: 5,267,024
[45] Date of Patent: Nov. 30, 1993

[54] MULTIPLE SYSTEMS ADAPTIVE TELEVISION RECEIVER

[75] Inventor: Akihiro Murayama, Kanagawa, Japan

[73] Assignee: Kabushiki Kaisha Toshiba, Kanagawa, Japan

[21] Appl. No.: 766,359

[22] Filed: Sep. 26, 1991

[30] Foreign Application Priority Data

Sep. 26, 1990 [JP] Japan .................................. 2-256154
Nov. 19, 1990 [JP] Japan .................................. 2-313406

[51] Int. Cl.$^5$ .............................................. H04N 9/68
[52] U.S. Cl. ...................................... 358/26; 358/188; 358/25
[58] Field of Search .................. 358/23, 188, 139, 10, 358/17, 19, 148, 20, 140, 25, 26, 27, 28

[56] References Cited

U.S. PATENT DOCUMENTS 4,546,377 10/1985 Kasagi et al. ....................... 358/26 X
4,661,844 4/1987 Rufray et al. ........................... 358/23
4,918,529 4/1990 Dauziech et al. ................ 358/188 X

FOREIGN PATENT DOCUMENTS 1372922 12/1983 Japan .
60-17200 5/1985 Japan .

OTHER PUBLICATIONS

Patent Abstracts of Japan, vol. 9, No. 291, Group E-359, Publication No. JP60130290, published Nov. 19, 1985 (English abstract).
Patent Abstracts of Japan, vol. 9, No. 8, Group E-289, Publication No. JP59156096, published Jan. 12, 1985 (English abstract).
Patent Abstracts of Japan, vol. 10, No. 87, Group E-393, Publication No. JP60229597, published Apr. 5, 1986 (English abstract).
Patent Abstrancts of Japan, vol. 9, No. 263, Group E-351, Publication No. JP60109988, published Oct. 19, 1985 (English abstract).
Patent Abstracts of Japan, vol. 4, No. 40, Group E-4, Publication No. JP55011649, published Mar. 28, 1980 (English abstract).

Primary Examiner—Victor R. Kostak
Attorney, Agent, or Firm—Finnegan, Henderson, Farabow, Garrett & Dunner

[57] ABSTRACT

A multiple systems adaptive television receiver which is able to receive different system television signals such as the PAL system, the NTSC system, the SECAM system including a chrominance signal and a unique ID signal of the different television signals. The television receiver includes an ACC circuit for stabilizing the amplitude of the chrominance signal by the identification signal, the ACC circuit including a detector for detecting the ID signal, at least two ID discriminators each dedicated for discriminating the unique ID signal obtained by the ACC circuit, a control circuit for assigning priority of discriminating sensitivity to the each ID discriminator and a circuit for increasing the sensitivity of the each ID discriminator in response to an information for stabilizing the chrominance signal and an output from the active one of the ID discriminators.

5 Claims, 9 Drawing Sheets

PAL.
CHROMINANCE
SIGNAL

PAL. ID
DETECTION
VECTOR

PAL. ID
OUTPUT

NISC. ID
DETECTION
VECTOR

NISC. ID
OUTPUT

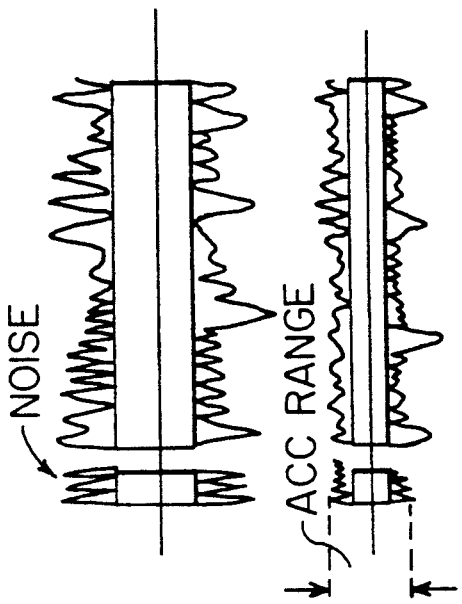
FIG. 7(b)
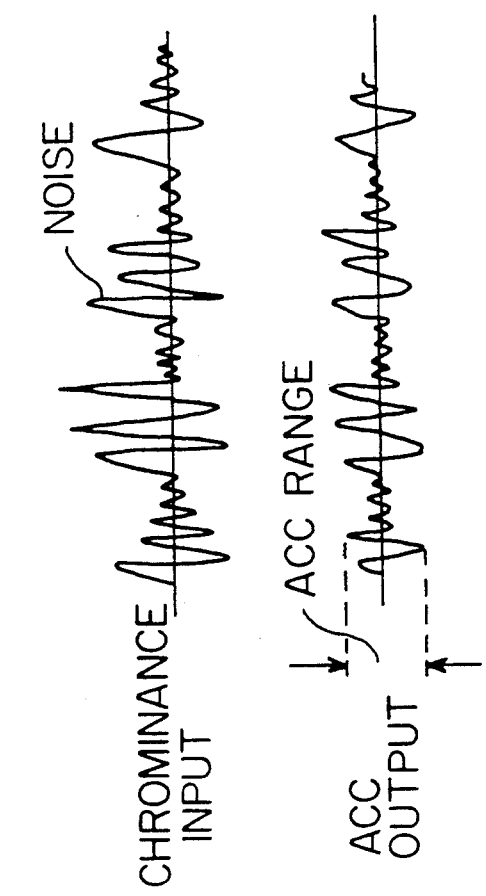
FIG. 7(d)
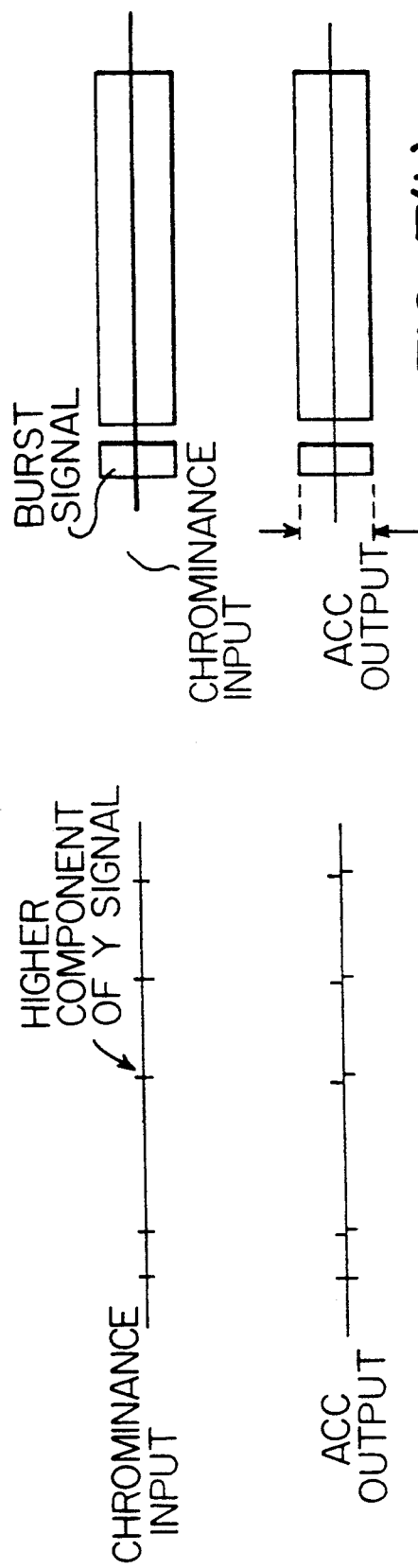
FIG. 7(a)
FIG. 7(c)

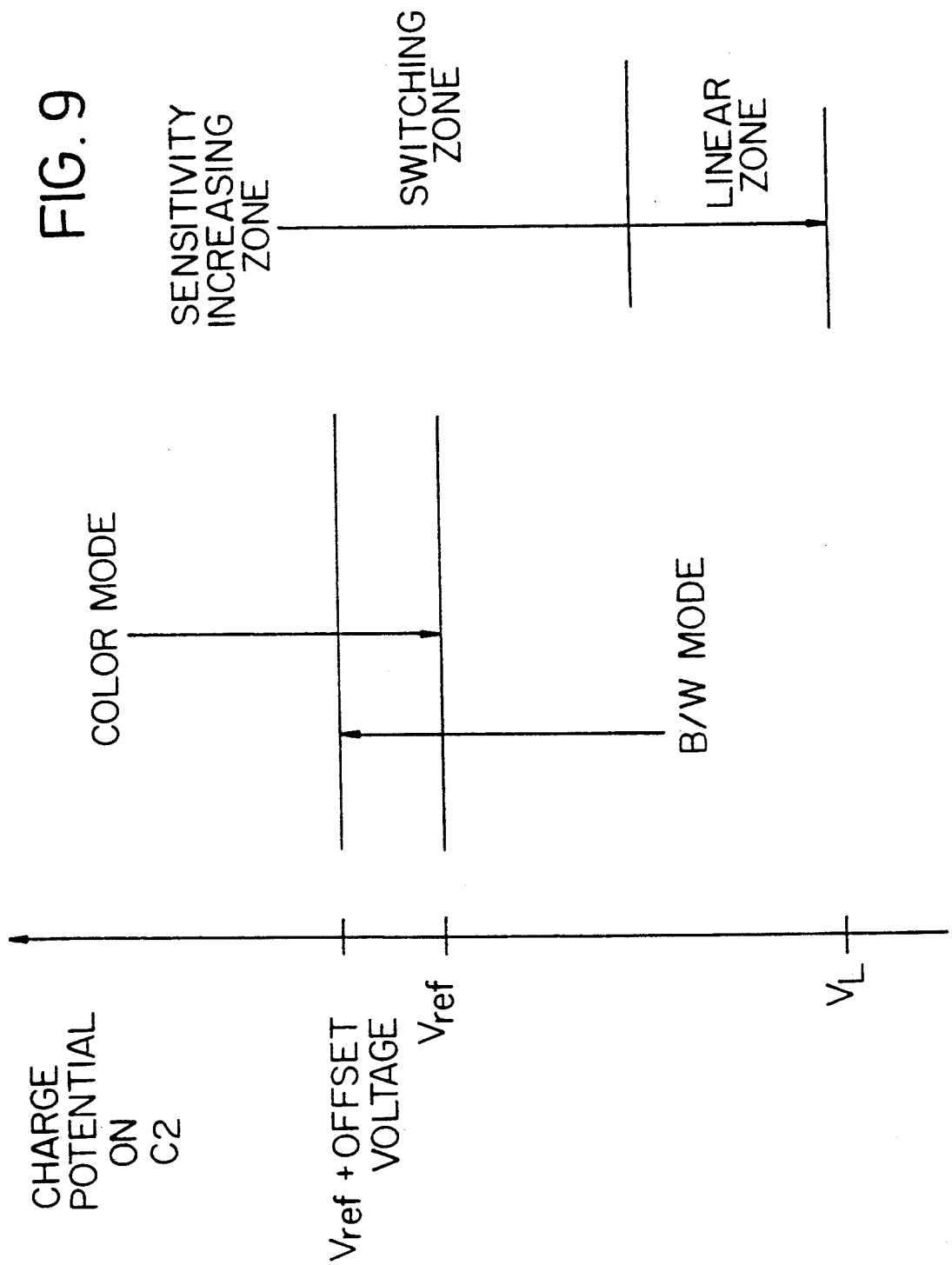

MULTIPLE SYSTEMS ADAPTIVE TELEVISION RECEIVER

FIELD OF THE INVENTION

The present invention relates generally to a television receiver, and more particularly to a multiple systems adaptive television receiver which is able to receive a television signal broadcasted at a location of the television receiver.

FIELD OF THE INVENTION

Color television signals presently in practical use in the world are broadly classified into the NTSC, PAL and SECAM systems, which have peculiar features and television receivers adaptable to respective systems have been manufactured.

Recently, with the extended use of broadcasting and the progress of diversification of media for disseminating video information, areas and chances of receiving a different type of television signals, i.e., the NTSC, PAL and SECAM television signals are increasing. Thus a television receiver adapted for receiving at least two of those television signals has been developed.

FIG. 1 shows a color signal processor of such a television receiver capable of receiving multiple color television signals. Chrominance signal separated from composite video signal are supplied to an input terminal 1 and then, input to PAL, NTSC and SECAM signal processing circuits.

In case of the PAL and NTSC systems, as being AM modulated by color subcarrier, chrominance signals are demodulated in AM demodulation circuits 2, 3 to get color difference signals. In case of the SECAM system, as chrominance signals have been transmitted after FM demodulated, they are demodulated in an FM demodulation circuit 4 of the television receiver to get color difference signals.

A system discriminating signal called the identification signal (hereinafter called as ID) is added for each demodulation circuit. The television receiver also has ID discriminating circuits 5, L and 7 to discriminate which system's ID signal is input. The result of discrimination that is output from each ID discrimination circuit is input to a discrimination logic routine circuit 12 after passing through wave shaping circuits 8, 9 and 10. This discrimination logic routine circuit 12 assigns priority of color signal system and outputs the result of discrimination to a switch 13. The switch 13 selects one system output selected by the discrimination logic routine circuit 12 from the outputs of all system color demodulation circuits. The demodulated signal selected by the switch 13 is input to a matrix circuit 14 which processes matrix operations on the demodulated signal for producing three color difference signals, i.e., R-Y, G-Y and B-Y. These three color signals are obtained on an output terminal 15.

As described above, the ID of each color television system is detected and outputs from the demodulation circuits are selected based on the result of this detection and therefore, desired color system signals can be demodulated and broadcasted video can be received even when multiple system demodulation circuits are mixed in a television receiver.

However, in such a conventional multiple systems adaptive television receiver, a malfunction tends to occur in system discrimination depending upon sensitivities of the ID discrimination circuits 5, 6 and 7, assignment of priority, status of input signal in a weak electric field, and the like, and there was such a defect that demodulated color signal system differed from received color signal system and a video was not properly colored.

SUMMARY OF THE INVENTION

It is, therefore, an object of the present invention to provide a multiple systems adaptive television receiver which is durable against such a color signal deterioration factor as a weak electric field and hardly causes a malfunction.

In order to achieve the above object, a multiple systems adaptive television receiver according to one aspect of the present invention includes an ACC circuit for stabilizing the amplitude of the chrominance signal by the identification signal, the ACC circuit including a detector for detecting the ID signals, at least two ID discriminators each dedicated for discriminating the unique ID signal obtained by the ACC circuit, a control circuit for assigning priority of discriminating sensitivity to the each ID discriminator and a circuit for increasing the sensitivity of the each ID discriminator in response to an information for stabilizing the chrominance signal and an output from the active one of the ID discriminators.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 7A-7D are a signal waveform diagram for explaining the operation of the circuit shown in FIG. 6;

FIG. 9 is a level diagram for explaining the operating level shown in FIG. 8.

DESCRIPTION OF THE PREFERRED EMBODIMENTS

Figure 1:
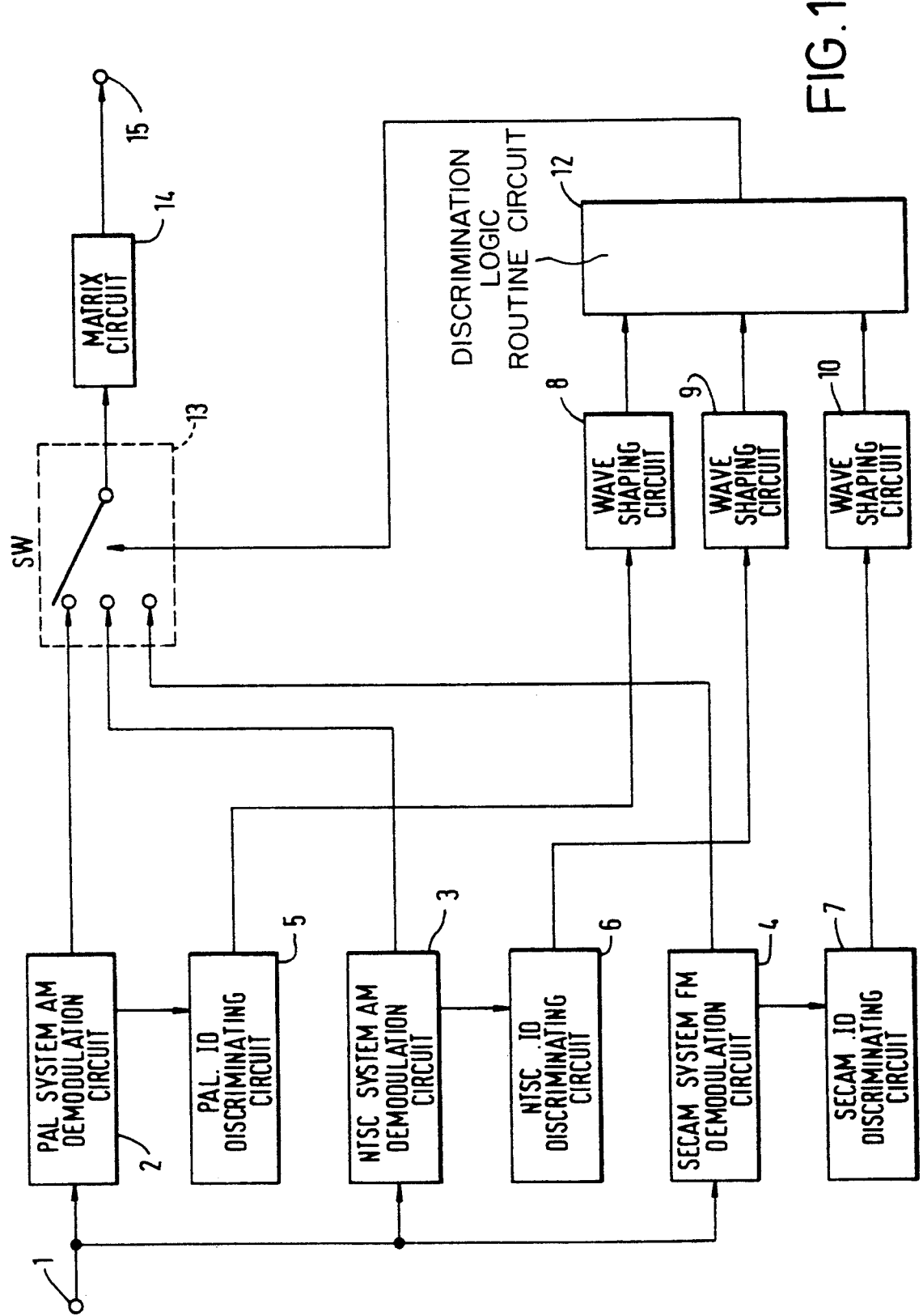
FIG. 1 is a system diagram showing the conventional color television signal system discrimination circuit.

The present invention will be described in detail with reference to the FIGS. 2 through 9. Throughout the drawings, reference numerals or letters used in FIG. 1 will be used to designate like or equivalent elements for simplicity of explanation.

Figure 2:
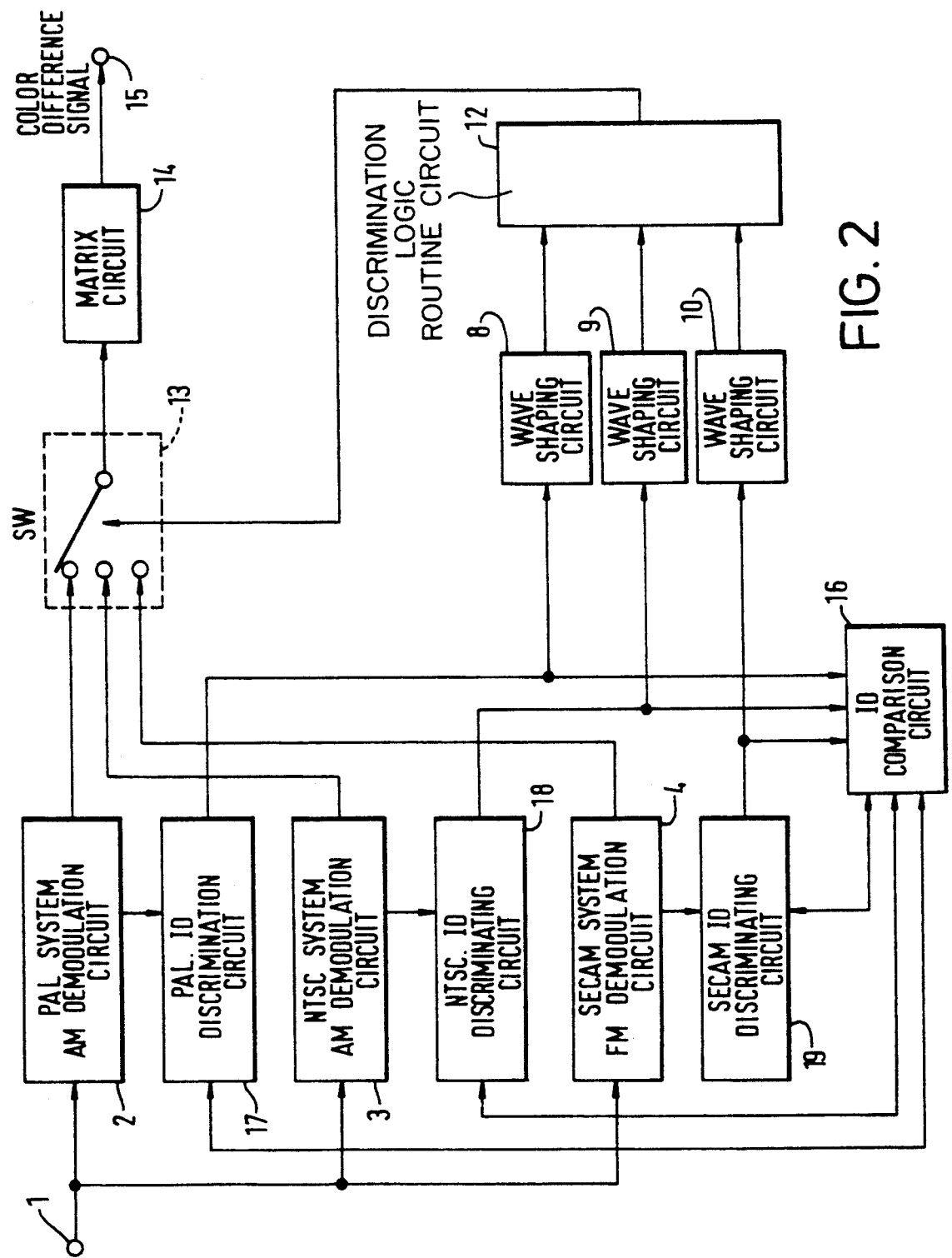
FIG. 2 is a system diagram showing a first embodiment of the television signal system discrimination circuit according to the present invention.

Referring now to FIG. 2, a first embodiment of the multiple systems adaptive television receiver according to the present invention will be described in detail. In FIG. 2, parts which are not relevant to the control of the apparatus are omitted from the illustration.

In FIG. 2, a chrominance signal obtained by separating from composite video signal is input to an input terminal 1 and then, supplied to PAL, NTSC and SECAM system demodulation circuits 2, 3 and 4. The signals demodulated by the circuits 2, 3 and 4 are output to a switch 13 and one of the demodulated signals is selected and output by the control signal of a discrimination logic routine circuit 12 likewise conventional television signal system discrimination circuits.

The output from the switch 13 is input to a matrix circuit 14, in which it is matrix processed to color difference signals of R-Y, G-Y and B-Y and output to an output terminal 15. Sensitivities of discrimination of ID discrimination circuits 17, 18 and 19 are controllable externally likewise the conventional television receivers.

For instance, if the system priority is set at P>N>S, the initial sensitivity of discrimination of the discrimination circuits 17, 18 and 19 are set set P>N>S. Here, P, N and S are the abbreviation of PAL, NTSC and SECAM, respectively.

The outputs from the ID discrimination circuits 17, 18 and 19 are input to an ID comparison circuit 16 and the result of comparison is fed back to the ID discrimination circuits 17, 18 and 19 in order to increase sensitivity of discrimination of the ID discrimination circuit having the high discrimination output. Further, outputs of the ID discrimination circuits 17, 18 and 19 are input to wave shaping circuits 8, 9 and 10, and which system signal is being received is decided by the discrimination logic routine 12.

Now, a case where the PAL system color signal is received is explained. When the PAL system ID signal is input to the PAL and NTSC system ID discrimination circuits 17 and 18, because of the structure of these circuits 17 and 18, the PAL system ID signal is discriminated in both the circuits 17 and 18. Since sensitivity of discrimination of the circuit 17 is high, the discrimination output of the PAL discrimination circuit is higher than that of the NTSC discrimination circuit and discrimination sensitivity of the PAL circuit is increased in the ID comparison circuit, while sensitivity of the NTSC circuit is suppressed.

Thus, the entire color demodulation system operates stably at the PAL system. Similarly, if the NTSC or SECAM system color signal is received, this color signal is positively discriminated between the discrimination circuits 18 and 19 and the ID comparison circuit 16.

In this way, as sensitivity of ID discrimination of a color system that is originally to take preference has priority to other color systems, the ID signal of this color system is easily discriminated, the discriminating function increases in the ID comparison circuit 16 and malfunction can be positively prevented.

Figure 3:
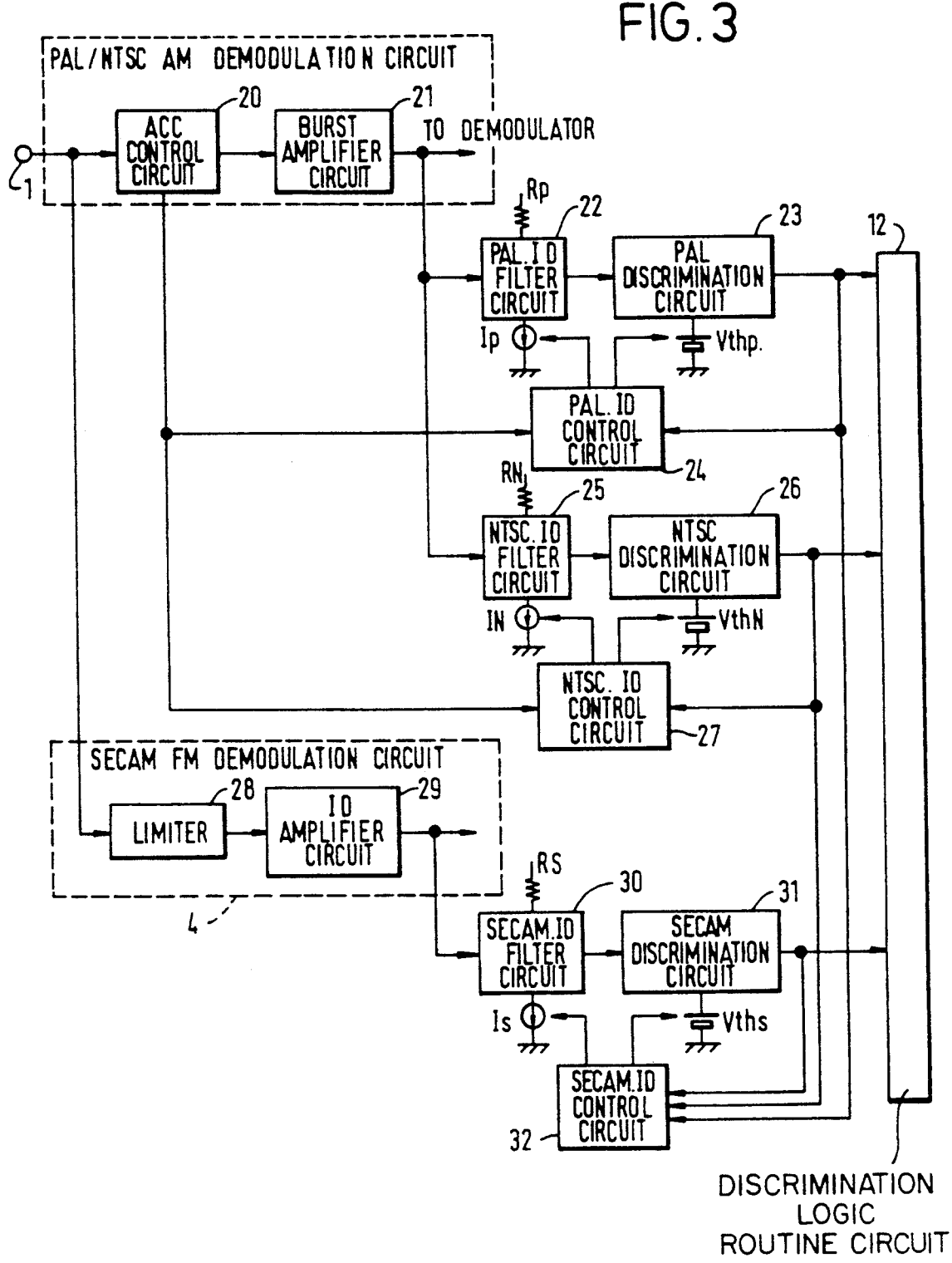
FIG. 3 is a block diagram showing a part of the FIG. 2 in more detail.

FIG. 3 is a detailed construction of a part of FIG. 2. In FIG. 3, a demodulation circuit is commonly used by the NTSC and PAL systems, which are similar in system structure. Chrominance signal applied to the chrominance signal input terminal 1 is input to an ACC circuit 20 and a stable amplitude burst signal is obtained by the gain control loop in this ACC circuit. The output from the ACC circuit 20 is input to a burst amplifier circuit 21. The amplified burst signal is input to a PAL ID filter 22 and an NTSC ID filter 25.

In these ID filter circuits 22 and 25, signals synchronized with color subcarrier signals and a burst signal output from the color signal demodulation circuits 2 and 3 are detected synchronously. Detection outputs are stored in a capacitor and their voltages are input to a PAL discrimination circuit 23 and an NTSC discrimination circuit 26 and after compared with the comparison voltage source Vthp and VthN, they are output to the discrimination routine and a SECAM ID control circuit 32.

In a PAL ID control circuit 24, the output from the PAL discrimination circuit 23 and the ACC circuit 20 control information are input to control the detection current of the PAL ID filter 22 and threshold voltage Vthp of the PAL discrimination circuit 23.

Similarly, in an NTSC ID control circuit 27, the output of the NTSC discrimination circuit 26 and the ACC circuit 20 control information are input to control the detection current of the NTSC ID filter 25 and threshold voltage V thN of the NTSC discrimination circuit 26.

In the SECAM system color signal demodulation circuit 4, the input chrominance signal is amplified by a limiter 28 and extracting the ID signal only, it is amplified in an ID amplifier circuit 29. This ID signal is input to a SECAM ID filter circuit 30 and the result of comparison of the output with the threshold voltage Vths in a SECAM discrimination circuit 31 is output to a SECAM ID control circuit 32.

In the SECAM ID filter circuit 30, as the ID signal has been FM modulated, the signal is FM demodulated and the capacitor is charged. In the SECAM ID control circuit 32, the outputs from the PAL, NTSC and SECAM discrimination circuits 23, 26 and 31 are input and only when the output from the SECAM ID discrimination circuit 31 is higher than the other two discrimination outputs, the detection current Is and threshold voltage V ths of the SECAM ID filter circuit 31 are controlled.

Now, it is assumed that the priority of P>N>S is set for the system shown in FIG. 3 as an example. Since the detection sensitivities of the ID filters are determined by the load resistances Rp, Rn and Rs, sizes of the load resistance are also set at Rp>Rn>Rs.

Thus, if the PAL and NTSC chrominance signals are received, each ID discrimination circuit increases its own sensitivity and when the SECAM system chrominance signal is received, if the output of the SECAM ID discrimination circuit 31 is higher than those of other ID discrimination circuits 23 and 26, the SECAM ID discrimination circuit 31 can increase its own discrimination sensitivity.

Figure 4:
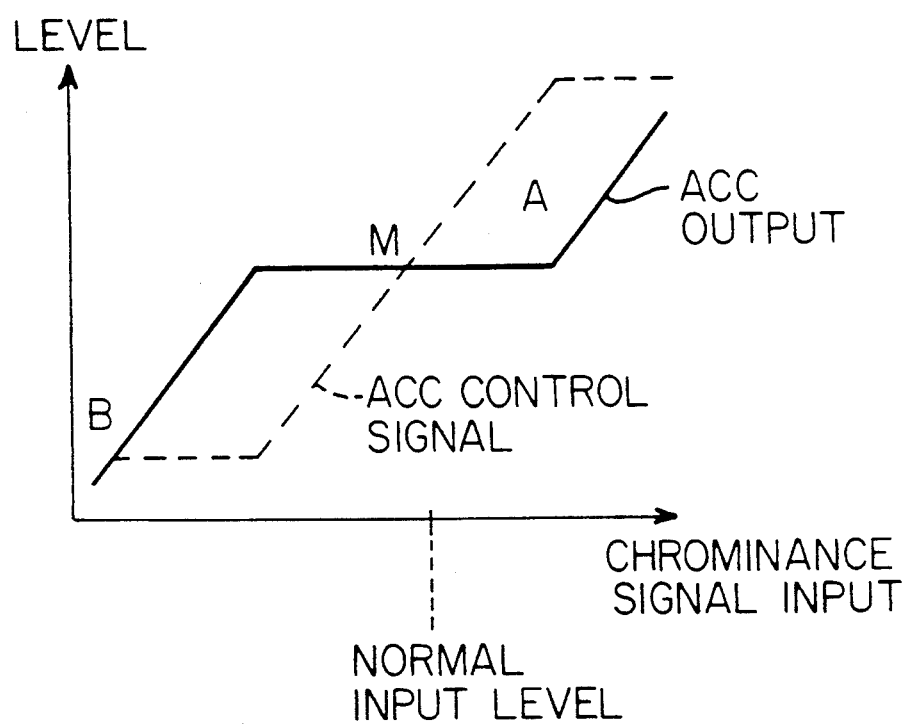
FIG. 4 is a characteristic diagram showing the operation of the ACC circuit shown in FIG. 3.

Here, the operation of the ACC circuit 20 is described referring to FIG. 4. If the burst signal of the chrominance input signal is sufficiently small, the ACC circuit is kept open and at the maximum gain. When the burst signal level becomes large, the ACC circuit 20 is closed and the burst signal level output from the ACC circuit 20 becomes constant. When the burst amplitude becomes further large to exceed the reduction range of the ACC circuit 20, the circuit 20 is opened again and the burst signal output increase is proportion to the input. The dotted line in FIG. 4 shows the change of the gain control voltage of the ACC circuit 20.

TABLE A shows the input signal and the control status of the ACC circuit 20 by the electric field. In the strong electric field, the ACC circuit operates in proportion to the input signal while in the weak electric field, the operating point shifts in the "H" direction because pulse noise is superposed on the chrominance signal and the noise is regarded to be the burst signal if the peak detection system is adopted for the ACC circuit.

TABLE A

| SIGNAL | | FIELD STATE | |
|---|---|---|---|
| | | STRONG | WEAK |
| Chrominance Signal | Small Signal (ACC Active) | L | M |
| | Large Signal (ACC inactive) | H | M-H |
| B/W signal | | L | M |
| No Signal | (Idle Channel) | M | M |

Use of the ACC control information in the system shown in FIG. 3 is to control sensitivity increases of the ID discrimination circuits 23, 26 and 31 for the input signals as shown in TABLE A. For instance, if sensitivity of the discrimination circuit is increased only when the ACC control status is "H", sensitivity of discrimination is not increased for B/W signal and micro signal for which sensitivity should not be increased intrinsically.

TABLE B shows the operations of the ID discrimination circuits 23, 26 and 31 to the chrominance input signal of each color system.

TABLE B

| ID | SIGNAL | | | | |
|---|---|---|---|---|---|
| | PAL | 3.58N | 4.43N | SECAM | B/W |
| PAL | H* | M | M | M | M |
| NTSC | H* | H* | H* | M | M |
| SECAM | M | M | M | H | H |

If the PAL system chrominance signal is input, not only the output of the PAL ID discrimination circuit 22 but also the output from the NTSC ID discrimination circuit 26 are discriminated.

In other systems, "H" output is obtained as the output from the applicable discrimination circuit. The * mark shows sensitivity up control by the ACC control information described above. "M" in TABLE B indicates that the filter output becomes center voltage as there is no detection output in the ID detection circuit. Here, how the PAL system color signal is detected in the PAL and NTSC ID discrimination circuits 23 and 26 is shown in FIG. 5.

Figures 5A, 5B, 5C, 5D, 5E:
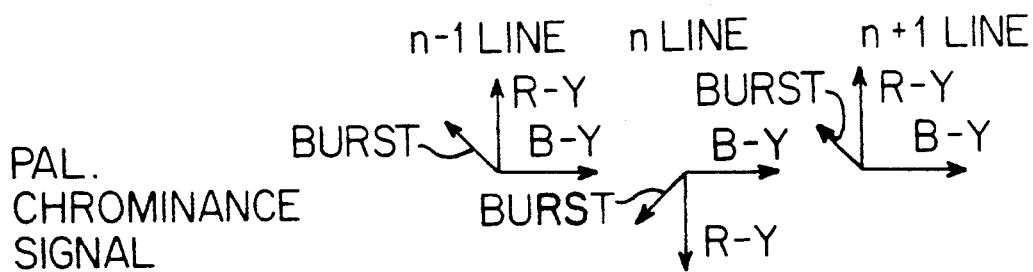
FIGS. 5A-5E are a vector diagram for explaining the operation of the ACC circuit shown in FIG. 3.

In case of the PAL system, the R-Y signal component of the chrominance signal is reversed every horizontal period and the burst signal is also transmitted by shifting its phase by 90° every horizontal period and it presents a vector as shown in FIG. 5(a).

When this burst signal is detected using the detection vector shown in FIG. 5(b), its output presents the positive vector in equal size for every horizontal period. On the other hand, in the NTSC system discrimination circuits, as a 180° vector is used as the detection vector as shown in FIG. 5(d), its discrimination output also presents a positive vector in equal size for every horizontal period. The PAL and NTSC system discrimination circuit outputs are equal to each other and therefore, the PAL ID output and the NTSC ID output are both discriminated.

Therefore, when the PAL system chrominance signal is being received, the NTSC system ID discrimination output is also discriminated. As explained for FIG. 3, if sensitivity of discrimination of both discrimination circuits is set at PAL>NTSC in advance, when the PAL system chrominance signal is received, it is possible to prevent this signal from being discriminated to be the NTSC system chrominance signal.

Further, the SECAM system discrimination circuit has such defects as it tends to cause malfunction due to noise and the like because the FM demodulation is carried out in the circuit, it is easily discriminated to be the PAL system chrominance signal because the PAL system color subcarrier is positioned inside the SECAM ID demodulation band, and therefore, it is necessary to perform discrimination sensitivity up carefully.

For this, in the system shown in FIG. 3, even when the output of the SECAM ID discrimination circuit 31 becomes "H", discrimination sensitivity is not increased unless it is higher than the voltages of the PAL and NTSC system ID discrimination circuits 23 and 26.

In the system shown in FIG. 3, discrimination sensitivity is increased independently for the PAL and NTSC system while it is increased for the SECAM system by comparing with other discrimination circuits and the sensitivity up of the PAL and NTSC system ID discrimination circuit 23 and 26 is controlled according to the ACC circuit information.

There are various methods available depending upon combination in addition to those shown above. For instance, the ACC control can be applied to the SECAM system ID discrimination circuit 31. Chrominance signal, even when it is the SECAM system, passes through the ACC circuit in the PAL and NTSC blocks, it is subject to the ACC (the automatic chrominance signal level control), which is although not an intrinsic operation. So, if the SECAM system ID discrimination circuit 31 is controlled according to the ACC control information, the optimum sensitivity up control can be performed according to the input status likewise the PAL and NTSC system ID discrimination circuits.

Further, the maximum value detection being performed in the SECAM system ID discrimination circuit 31 may be performed for all other discrimination circuit. In addition, many other combinations are considered but are omitted here.

In the first embodiment of the multiple systems adaptive television receiver, use of the television signal system discrimination circuits involved in the present invention makes it possible to provide the positive color television signal system discrimination circuits which are durable to color signal deterioration factor in the weak electric field and hardly cause malfunctions.

Figure 6:
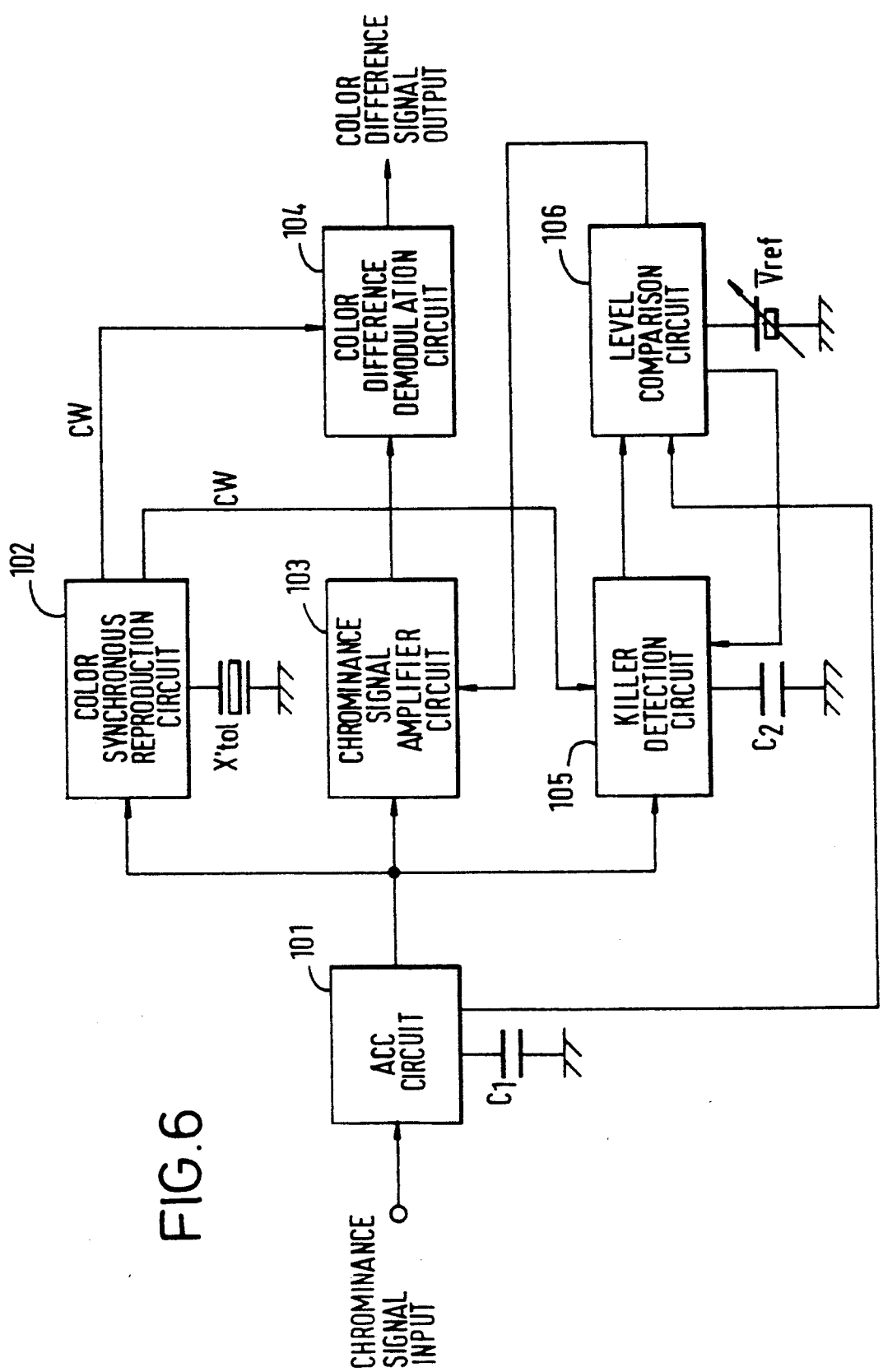
FIG. 6 is a block diagram of a second embodiment of the television signal system discrimination circuit according to the present invention.

Referring now to FIG. 6, a second embodiment of the multiple systems adaptive television receiver according to the present invention will be described in detail. In FIG. 6, the chrominance signal separated from the composite video signal is input to an ACC circuit 101. A color difference signal is output to a chrominance signal amplifier circuit 103, and a burst signal is output to a color synchronous reproduction circuit 102 and a killer detection circuit 105. The output of the killer detection circuit 105 is applied to a level comparison circuit 106 and the result of comparison is output to the chrominance signal amplifier circuit 103. The output from the color synchronous reproduction circuit 102 is fed to the killer detection circuit 105 and a color difference demodulation circuit 104. The demodulated output for the color difference demodulation circuit 104 is output as the color difference base band signal. Control information of the ACC circuit 101 is input to the comparison circuit 106 and the second output of the level comparison circuit 106 is input to the killer detection circuit 105. The level comparison circuit 106 is suppled with a reference voltage Vref which is controllable by an external control signal.

First, the chrominance signal of which amplitude has been stabilized in the ACC circuit 101 is input to the chrominance signal amplifier circuit 103. After regulation by user, the chrominance signal is output to the color difference demodulation circuit 104. The burst signal from the ACC circuit 101 is output to the color synchronous reproduction circuit 102 and the killer detection circuit 105. The color synchronous reproduction circuit 102 produces two CW signals whose frequency are locked to the frequency of burst signal using a crystal oscillator, but are different in phase with each other. One of the CW signals is applied to the killer detection circuit 105 for implementing a synchronous detection therein. The other CW signal is applied to the color difference demodulation circuit 104 for implementing demodulation of base band color difference signals.

In the killer detection circuit 105, the synchronous detection is carried out with the CW signal in the same phase as the input burst signal. A detection output is charged into the capacitor C2 and then a charged voltage of the detection output is applied to the signal level comparison circuit 106. In addition to the killer detection output voltage, an ACC control information from the ACC circuit 101 is applied to this signal level comparison circuit 106. The ACC control information has a voltage configuration if the ACC circuit 10 is the type of voltage control operation. Accordingly, in the signal level comparison circuit 106, levels of the reference voltage Vref and the killer detection output voltage are detected and the result of comparison is output to the chrominance signal amplifier circuit 103.

Here, the sensitivity of the killer detection circuit 105 can be raised by the external control signal and the level of the reference voltage Vref also can be increase-decreased by the external control signal.

In the course of level comparison, "AND" logic between the ACC control information of the ACC circuit 101 and the killer detection output of the killer detection circuit 105 is operated so that the detection sensitivity of the killer detection circuit 105 and the reference voltage are controlled according to the result of "AND" logic. Thus, it becomes possible, for instance, to raise the killer detection sensitivity while to decrease the reference voltage Vref when the killer detection output voltage is high.

This method has brought the result of input signal method discrimination more closer to the color mode and is suited for receiving color signals in a weak television signal reception field. If it is so set that the sensitivity of the killer system is raised only when the "AND" logic satisfied required conditions, it becomes possible to prevent an excess rise of the detection sensitivity under other conditions and malfunction in the weak signal input of monochromic (hereinafter referred to B/W) mode.

Referring now to FIG. 7, the second embodiment of the present invention will be further explained in detail. Shown in FIG. 7(a) are the input chrominance signal and the ACC output signal when the B/W mode signal in the environment of a strong signal input is received. Since the B/W mode signal in the strong electric field is received, the input chrominance signal will show the noseless waveform with some cross color component of luminance signal and high frequency band component of synchronizing signal. The sensitivity of the ACC circuit 101 becomes maximum (MAX gain) as there exists no signal of which amplitude is to be stabilized and an input amplified signal appears as the output. However, the output signal still has noise but no component synchronizing with color subcarrier and therefore, the killer detected output will become an "L" (low) level.

Shown in FIG. 7(b) are the input chrominance signal and the ACC output signal in a strong television signal reception field. The chrominance signal shows the noiseless signal waveform because of the strong field. The burst signal level sufficient enough to close the ACC loop is obtained and the output signal shows the waveform which became the reference having the burst amplitude. Since the burst signal at the sufficient level is supplied to the killer detection circuit 105, the killer detection output will become to an "H" level.

Signal waveform in the weak field are shown in FIGS. 7(c) and 7(d). Shown in FIG. 7(c) are signals when the B/W mode signal was received in the 3eak field. The input chrominance signal shows the waveform with pulsive noises because of the weak field. The ACC circuit 101 compresses the noise as the noise amplitude is high. Since the peak detection is carried out at the timing when the burst signal is to be positioned, the noise amplitude is attenuated by regarding a certain noise as the burst signal as shown in the drawing.

The output signal obtained at this time has a considerably large amplitude, but because of the same B/W mode signal as in FIG. 7(a) it has no component synchronized to color subcarrier. Therefore, the killer detection output in this case will become the "L" level. Shown in FIG. 7(d) are signals when the color mode signal in the weak field is received. Likewise the signals shown in FIG. 7(c), the chrominance signal has pulsive noises and the ACC circuit 101 controls the burst signal and the noises.

Accordingly, the output signal takes a waveform in that the chrominance signal is compressed by the range of the noise. The killer detection output voltage at this time is in the unstable state. If the noise is high, the chrominance signal is compressed accordingly and becomes weak to the "L" level. If the noise is not so high, the waveform becomes to the "H" level close to the state as shown in FIG. 7(b). Thus, the output signals can take any waveform according to volume of noise.

Referring back to FIG. 4 the operation of the ACC circuit 101 for input signal level will be described in detail. When the input signal level is very low, the operating point is at near the point B. When the input signal level increases to the ACC control range of the ACC circuit 101, the output becomes flat. When the input signal level further increases over the control level, the ACC circuit 101 operates at a point near the point A. In the operation state near the point A, the ACC circuit 101 does no longer implement the ACC control operation so that the output increases together with the input level.

The operating points A and B in FIG. 4 and the killer detection output levels ("H", "L") can be expressed by the following TABLE 3 in reference to the four status shown in FIGS. 7(a) to 7(d).

TABLE 3

| FIELD STATE | SYSTEM | |
| --- | --- | --- |
| | B/W | Color |
| Strong | B / "L" | A / "H" (*) |
| Weak | A / "L" | A / "H" (*) |
| (ACC/Killer Outputs) | | |

When the ACC operating point is A and the killer detection output is "H", the color mode is as shown by * in the TABLE 3 as described above. If the detection sensitivity of the killer detection circuit 105 is raised and the comparison reference voltage Vref is lowered at this time, it is possible to shift to the color mode. It is therefore possible to bring the operation state where colors are hardly vanished on an image screen by lowering a threshold level of the burst input level for vanishing color.

Figure 8:
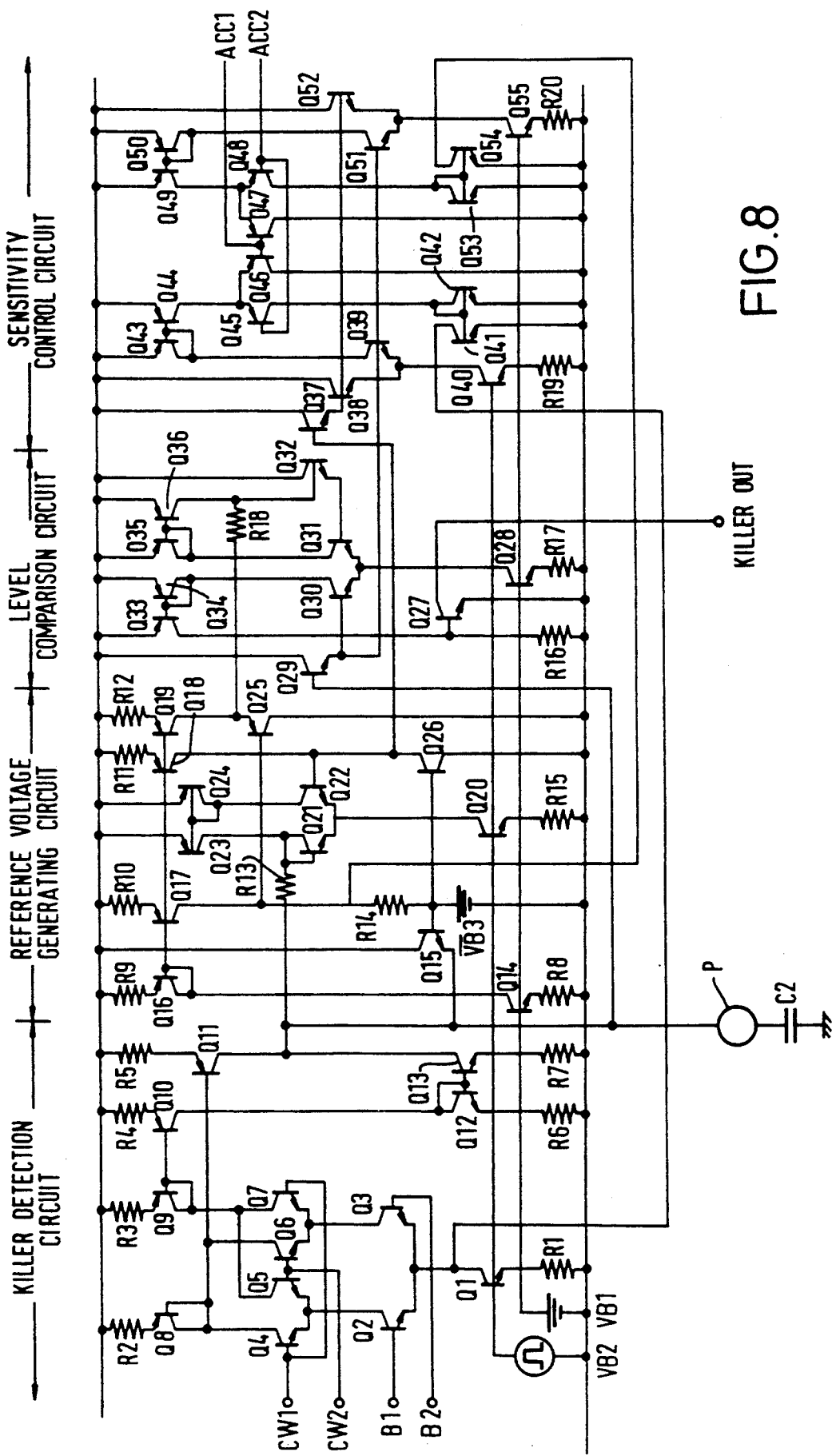
FIG. 8 is a circuit diagram showing a practical circuit of the killer detection circuit shown in FIG. 6.

Shown in FIG. 8 is a practical circuit example of the killer discrimination circuit which is embodied on an IC chip. The killer detection circuit 105 consists of transistors Q1, Q2, Q13 and resistors R1 to R7, the source of the reference voltage Vref consists of transistors Q14 to Q26 and resistors R8 to R15. The level comparison circuit 106 consists of transistors Q27 to Q36 and resistors R16, R17, R18. The sensitivity control circuit consists of transistors Q37 to Q55 and resistors R19, R20. Terminals B1 and B2 receive burst signals from the color synchronous reproduction circuit 102. Lines ACC1 and ACC2 output the ACC control voltages obtained by the circuit. Voltage sources VB1 and VB3 supply constant voltages. A source VB2 supplies a gate voltage VB2.

In the killer detection circuit 105, the transistor Q1 is turned ON by the gate voltage VB2 only for the period when the burst signal exists. Then the synchronous detection circuit consisting of the transistors Q2 to Q13 is turned ON so that a detection current is output therefrom. In the Vref generation circuit, the transistor Q17 applies a current to the constant voltage VB3 through the resistor R14 to generate a voltage given by [VB3+R14×I17] as the reference voltage Vref. Where R14 represents the resistance of the resistor R14 and I17 represents the collector current of the transistor Q17.

The transistors Q20 to Q24 from a buffer to add a load resistor R13 of the detection circuit synchronized to the gate. This is effected by making the transistors Q21 to Q24 active by the gate current source of the transistor Q20. When the gate is ON, the base potential of the transistor Q21 lowers the potential given by [VB3+VBE26] (i.e., the base to emitter voltage of the transistor Q26). When the detection output current is zero, a potential of the terminal P of the capacitor C2 is put to the potential. During the gate period, the killer detection circuit 105 applies its output current to the load resistor R13 and the capacitor C2. During the period other than the gate period, no killer output current is provided so that the killer detection circuit 105 is cut off and the resistor R13 is also in the open state. Therefore, the capacitor C2 holds the detection voltage.

In the level comparison circuit 106, the charged voltage of the capacitor C2 is compared with the voltage which is obtained by level shifting the reference voltage Vref by the buffer of the transistor Q25. If the voltage of the terminal P is higher, a current flows to the transistor Q30 so that the transistor Q27 is turned ON by an operation of a current mirror connection comprising of the transistors Q33 and Q34, and the output of the killer circuit becomes the "L" level.

If the voltage of the terminal P is lower than the reference voltage Vref, the transistor Q31 is turned ON, and a current flows to the resistor R18 via a current mirror connection comprising of the transistors Q35 and Q36 so that the base potential of the transistor Q32 becomes higher than the reference voltage Vref. This offset voltage disappears when the transistor Q30 is turned ON. That is, this offset voltage will have a hysteresis width and once put in a killer ON mode or a killer OFF mode, it becomes hard to shift to the reverse mode.

The sensitivity control circuit consists of two symmetrical circuits; one is a circuit consisting of transistors Q38 to Q46, which is operated by the gate current source Q40 and the other is a circuit consisting of transistors Q47 to Q55 which is operated by a constant current source Q40 raises the sensitivity of the killer detection circuit 105.

If the voltage of the terminal P is higher than VL, a current flows to the transistor Q39, and further to a switch consisting of the transistors Q45 and Q46 through a current mirror connection consisting of transistors Q43 and Q44. The ACC control voltage decides to which transistor Q45 or Q46 current flows. If the ACC circuit 101 is operating at the point A, a current flows to the transistor Q45, and further to the transistors Q2 and Q3 through the current mirror connection consisting of the transistors Q41 and Q42.

Thus, a bias current flows in parallel with the collector current of the transistor Q1, which is the bias current of the killer detection circuit 105 and the detection output current becomes large. Thus, it becomes possible to raise the sensitivity of the killer detection circuit.

Another sensitivity control circuit in the part of the arrangement of the transistors Q47 to Q55 controls the reference voltage Vref. If the voltage of the terminal P is higher than VL, the transistor Q51 is turned ON and applies current to the switch of the transistors Q47 and Q48 through the current mirror connection consisting of the transistors Q49 and Q50.

If the ACC circuit 101 operates at the point A likewise the circuit described above, the transistor Q48 is ON and the current flowing to the resistor R14 through the current mirror connection consisting of the transistors Q53 and Q54 is decreased. Thus, the comparison output voltage of the level comparison circuit can be lowered and it becomes possible to shift to the color mode even when the voltage of the terminal P is low.

The operating level of the practical circuit described above is shown in FIG. 9. The sensitivity increasing zone shows the area of which sensitivity is raised by operating the transistors Q38, Q39 and Q51, Q52 and in which respective differential pairs operate linearly.

Thus, the sensitivity of the entire killer discrimination system can be raised by "AND" of the operating point (control voltage) of the ACC circuit 101 and the output voltage of the killer detection circuit and it becomes therefore possible to realize a useful system discrimination circuit which is capable of coping with each case. In case of the monochromic mode broadcasting, as this system does not increase the sensitivity of the killer discrimination circuit, it does not misjudge the monochromic mode broadcasting as the color mode in the same way when the killer discrimination sensitivity is simply raised.

What have been described above are also applicable to both the NTSC and PAL color signal broadcasting systems. In case of the PAL system, R-Y color difference signals are sent while being reversed for every horizontal period and a circuit to discriminate this signal is needed. In this case, it is only necessary to add a line discrimination circuit directly to the system according to this invention and therefore, the explanation is omitted.

Further, as to the killer detection circuit, there are many examples other than the example of FIG. 8 and the increase of sensitivity by increasing bias current of the killer detection circuit is merely one example. As to the level comparison circuit, some circuits operate in current mode as the reference level. In this case, the sensitivity can be raised by controlling current of the reference current source.

In the second embodiment of the present invention, the color vanishment is prevented in the weak field and a retention of the same discrimination performance as before when a monochromic mode signal is received.

As described above, the present invention can provide an extremely preferable multiple systems adaptive television receiver.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A multiple systems adaptive television receiver which is able to receive at least two different system television signals, each including a chrominance signal and a unique identification signal of the different television signals, comprising:

means for stabilizing the amplitude of the chrominance signal of the received television signal by the identification signal, the stabilizing means including means for detecting the identification signal;

at least two means each dedicated for discriminating the unique identification signal obtained by the stabilizing means;

means for assigning priority of discriminating sensitivity to the each discriminating means; and means for increasing the sensitivity of the each discriminating means in response to an information for stabilizing the chrominance signal and an output from the active one of the discriminating means.

2. A multiple systems adaptive television receiver which is able to receive at least two different system television signals, each including a chrominance signal and a unique identification signal of the different television signals, comprising:

an ACC circuit for stabilizing the amplitude of the chrominance signal by the identification signal of the received television signal, the stabilizing means including means for detecting the identification signal;

a color synchronous reproduction circuit which produces first and second continuous waves synchronized to a burst signal from the ACC circuit, a killer detection circuit which synchronously detects the first continuous wave from the color synchronous reproduction circuit and the output burst signal from the ACC circuit, a signal level comparison circuit which, upon comparing a detection output of the killer detection circuit with a specified reference signal level, detects when a synchronous detection output has exceed the reference signal level, a color difference demodulation circuit which demodulates the chrominance signal from the ACC circuit by the second continuous wave of the color synchronous reproduction circuit, a means which shuts off the chrominance signal route with the output from the level comparison circuit to prevent the demodulation signal from appearing in the output from the demodulation circuit, and a means which controls detection sensitivity of the killer detection circuit or reference voltage of the level comparison circuit when control information of the ACC circuit and detection output information of the killer detection circuit satisfy required conditions.

3. The multiple systems adaptive television receiver as claimed in claim 2, wherein the detection sensitivity of the killer detection circuit is controlled by an AND logic function involving control information recognizing that the ACC circuit is receiving television signals and detection output information recognizing a presence of a synchronously detected burst component in the detection output of the killer detection circuit.

4. The multiple systems adaptive television receiver as claimed in claim 2, wherein a reference voltage of the level comparison circuit is controlled by an AND logic function involving control information recognizing that the ACC circuit is receiving television signals and detection output information recognizing presence of a synchronously detected burst component in the output of the killer detection circuit.

5. The multiple systems adaptive television receiver as claimed in claim 2, wherein:

the killer detection circuit cuts off a load resistance from the killer detection circuit for a horizontal period by applying an output current from the killer detection circuit to a holding capacitor and a load resistor of which one side is connected to a first reference voltage source;

the level comparison circuit including a first differential pair to detect a potential difference between a voltage of the holding capacitor and a second reference voltage source;

second and third differential pairs for detecting a potential difference between the first reference voltage and a holding capacitor voltage, and for outputting an output of the first differential pair as the detection output of the killer detection circuit;

first and second switching means for selecting outputs from the second and third differential pairs according to ACC control information;

means for controlling the detection sensitivity of the killer detection circuit by operation of the first switching means; and means for controlling a voltage of the second reference voltage source by operation of the second switching means.

* * * * *

UNITED STATES PATENT AND TRADEMARK OFFICE
CERTIFICATE OF CORRECTION

PATENT NO. : 5,267,024
DATED : November 30, 1993
INVENTOR(S) : Akihiro MURAYAMA

It is certified that error appears in the above-indentified patent and that said Letters Patent is hereby corrected as shown below:

Claim 1, Column 11, Line 49, delete "of the received television signal".

Claim 1, Column 11, Line 50, after "signal", insert --of the received television signal--.

Claim 2, Column 12, Line 12, change "exceed" to --exceeded--.

UNITED STATES PATENT AND TRADEMARK OFFICE
CERTIFICATE OF CORRECTION

PATENT NO. : 5,267,024
DATED : November 30, 1993
INVENTOR(S) : Akihiro Murayama

It is certified that error appears in the above-indentified patent and that said Letters Patent is hereby corrected as shown below:

Claim 2, Column 12, Line 19, change "demodulation" to --demodulated--.

Signed and Sealed this

Fourth Day of April, 1995

Attest:

BRUCE LEHMAN

Attesting Officer     Commissioner of Patents and Trademarks